(12) United States Patent
Zhang

(10) Patent No.: US 8,640,848 B1
(45) Date of Patent: Feb. 4, 2014

(54) SHAFT POSITIONING DEVICE

(71) Applicant: Primax Electronics Ltd., Taipei (TW)

(72) Inventor: Bing-Huai Zhang, Taipei (TW)

(73) Assignee: Primax Electronics Ltd., Neihu (TW)

( * ) Notice: Subject to any disclaimer, the term of this patent is extended or adjusted under 35 U.S.C. 154(b) by 0 days.

(21) Appl. No.: 13/664,184

(22) Filed: Oct. 30, 2012

(30) Foreign Application Priority Data

Aug. 14, 2012 (CN) .......................... 2012 1 0289062

(51) Int. Cl.
*B65G 13/11* (2006.01)
(52) U.S. Cl.
USPC ............................................ 193/37; 464/184
(58) Field of Classification Search
USPC ................... 464/184; 492/39, 47; 411/511;
74/813 R, 813 L; 384/438; 241/285.1;
193/37; 198/835
See application file for complete search history.

(56) References Cited

U.S. PATENT DOCUMENTS

| | | | | |
|---|---|---|---|---|
| 2,983,352 A | * | 5/1961 | De Flora et al. | 193/37 X |
| 3,053,368 A | * | 9/1962 | Klahn | 193/37 X |
| 3,252,556 A | * | 5/1966 | Isacsson | 193/37 |
| 4,558,780 A | * | 12/1985 | Burkhardt | |

* cited by examiner

*Primary Examiner* — Gregory Binda
(74) *Attorney, Agent, or Firm* — Evan R. Witt; Kirton McConkie

(57) ABSTRACT

The shaft positioning device includes a first supporting part, a second supporting part, and a position-limiting structure. The first supporting part includes a first hole. The second supporting part includes a second hole. After two ends of a shaft are penetrated through the first hole and the second hole, respectively, the position-limiting structure is located beside the first supporting part to limit the axial position of the shaft. Consequently, the shaft positioning device of the present invention is capable of positioning various types of shafts without the need of reserving a large installation space.

10 Claims, 10 Drawing Sheets

SHAFT POSITIONING DEVICE

FIELD OF THE INVENTION

The present invention relates to a shaft positioning device, and more particularly to a shaft positioning device for limiting an axial position of a shaft.

BACKGROUND OF THE INVENTION

As known, the applications of shafts are very wide. For example, a transmission shaft of an automatic document feeder, a transmission shaft of an ejecting mechanism of a post-processing device, a transmission shaft of a feeding mechanism of a paper shredder and a pivotal shaft between an upper cover and a base of an electronic device are some kinds of widely-used shafts. The shaft is usually used for transferring kinetic energy to drive rotation or movement of other components. Alternatively, two components may be connected with each other via the shaft, so that these two components may be rotated relative to each other. Generally, the shaft is installed in the region between two supporting parts, and two position-limiting elements are respectively located at both ends of the shaft for preventing detachment of the shaft.

The conventional position-limiting element is for example a C-shaped ring or an E-shaped ring. Hereinafter, a conventional shaft positioning device will be illustrated by referring the E-shaped ring as the position-limiting element. FIG. 1 is a schematic exploded view illustrating a conventional shaft positioning device. As shown in FIG. 1, the shaft positioning device 1 comprises a base 10, a first supporting part 11, a shaft 12, and a position-limiting element 13. The first supporting part 11 comprises a first hole 11a. The shaft 12 comprises a first ring-shaped recess 121. The position-limiting element 13 is an E-shaped ring.

It is noted that only at a first side of the base 10 and a first end of the shaft 12 are shown in FIG. 1. However, a second supporting part (e.g. a second hole) with the same structure as the first supporting part 11 is located at a second side of the base 10, and a second ring-shaped recess with the same structure as the first ring-shaped recess 121 is located at a second end of the shaft 12. For clarification and brevity, the second supporting part and the second ring-shaped recess are not shown in FIG. 1. Similarly, the shaft positioning device 1 has an additional position-limiting element (not shown) corresponding to the second end of the shaft 12.

FIG. 2 is a schematic assembled view illustrating the conventional shaft positioning device of FIG. 1. Hereinafter, a sequence of assembling the conventional shaft positioning device 1 will be illustrated with reference to FIGS. 1 and 2. Firstly, the two ends of the shaft 12 are penetrated through the first hole 11a and the second hole, respectively. Then, the two position-limiting elements 13 are engaged with the first ring-shaped recess 121 and the second ring-shaped recess, respectively.

After the two position-limiting elements 13 are respectively engaged with the first ring-shaped recess 121 and the second ring-shaped recess, if the shaft 12 is moved in a left direction or a in a right direction, a corresponding position-limiting element 13 is contacted with the first supporting part 11 or the second supporting part. Since both of the two ends of the shaft 12 fail to be detached from the first hole 11a and the second hole, the shaft 12 is positioned between the first supporting part 11 and the second supporting part.

From the above discussions, the two position-limiting elements 13 of the conventional shaft positioning device 1 are respectively located at the two ends of the shaft 12 in order to fix the shaft 12 between the first supporting part 11 and the second supporting part.

Hereinafter, an installation tool for installing the C-shaped ring or the E-shaped ring will be illustrated with reference to FIG. 3. FIG. 3 is a schematic perspective view illustrating an installation tool for installing the position-limiting element.

As shown in FIG. 3, the installation tool 14 comprises two clamping pieces 15, a rivet 16, a compression spring 17, and two clamping legs 18. Moreover, the two clamping legs 18 have respective tapered posts 181 at the top sides thereof.

The two clamping pieces 15 are crisscrossed. In addition, the two clamping pieces 15 are combined together through the rivet 16. A first end of each of the two clamping pieces 15 is formed as a handle 151. A second end of each of the two clamping pieces 15 is formed as the clamping leg 18. The installation tool 14 further comprises a receiving slot 19. The receiving slot 19 runs through the two clamping pieces 15 and located under the rivet 16. The compression spring 17 is accommodated within the receiving slot 19. After the two clamping pieces 15 are moved toward each other, the two clamping pieces 15 may be returned to the original positions by means of the compression spring 17.

Hereinafter, the operations of the installation tool 14 will be illustrated with reference to FIGS. 1 and 3. A process of installing the position-limiting element 13 by the installation tool 14 will be illustrated as follows. Firstly, the two tapered posts 181 are inserted into the inner periphery of the position-limiting element 13 to prop the position-limiting element 13 open. Then, the installation tool 14 is moved to the position near the shaft 12, and the position-limiting element 13 is aligned with the first ring-shaped recess 121. Then, the two handles 151 are gripped to allow the two clamping legs 18 to be moved toward each other. Consequently, the position-limiting element 13 is restored to the original shape and inserted into the first ring-shaped recess 121.

However, the conventional shaft positioning device still has some drawbacks. For example, since the shaft positioning device is only able to position the shaft having ring-shaped recesses at the both ends thereof, the process of fabricating the shaft positioning device is inconvenient and the fabricating cost is high. Moreover, the use of the installation tool to install the C-shaped ring or the E-shaped ring needs a large installation space. In other words, it is necessary to reserve large installation spaces beside the two supporting parts. Under this circumstance, the overall volume of the shaft positioning device is increased. The increased volume is detrimental to the general trends in designing light and small products.

Therefore, there is a need of providing an improved shaft positioning device in order to eliminate the above drawbacks.

SUMMARY OF THE INVENTION

The present invention provides a shaft positioning device for positioning various types of shafts with a reduced installation space.

In accordance with an aspect of the present invention, there is provided a shaft positioning device. The shaft positioning device includes a base, a first supporting part, a second supporting part, a shaft, and a position-limiting structure. The first supporting part is disposed on the base, and includes a first hole. The second supporting part is disposed on the base, and includes a second hole. The shaft has a first end penetrated through the first hole of the first supporting part and a second end penetrated through the second hole of the second supporting part. The position-limiting structure is used for preventing detachment of the shaft from the first hole or the second hole. The position-limiting structure includes a fixing recess and a fixing element. The fixing recess is formed in the base and located near the first end of the shaft. The fixing element is disposed within the fixing recess for stopping the first end of the shaft.

In an embodiment, the first hole is a through-hole, and the second hole is a blind hole.

In an embodiment, the shaft positioning device further includes a roller. The roller is sheathed around the shaft.

In an embodiment, the shaft includes a cylindrical body between the first end and the second end of the shaft. A diameter of the cylindrical body is larger than a diameter of the first end of the shaft and a diameter of the second end of the shaft.

In an embodiment, the base further includes an elongated groove. The first supporting part, the second supporting part and the fixing recess are all disposed within the elongated groove.

In an embodiment, both of the first hole and the second hole are through-holes.

In an embodiment, the shaft positioning device further includes a roller. The roller is sheathed around the shaft.

In an embodiment, the shaft includes a cylindrical body between the first end and the second end of the shaft. A diameter of the cylindrical body is larger than a diameter of the first end of the shaft and a diameter of the second end of the shaft.

In an embodiment, the base further includes an elongated groove. The first supporting part, the second supporting part and the fixing recess are all disposed within the elongated groove.

In an embodiment, the shaft positioning device further includes a sidewall. The sidewall is located beside the second supporting part.

In an embodiment, the base further includes an elongated groove. The first supporting part, the second supporting part, the fixing recess and the sidewall are all disposed within the elongated groove.

In an embodiment, the fixing recess is a screw hole, and the fixing element is a screw.

In an embodiment, the second supporting part further includes a guiding notch. The guiding notch is formed in an inner surface of the second supporting part.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
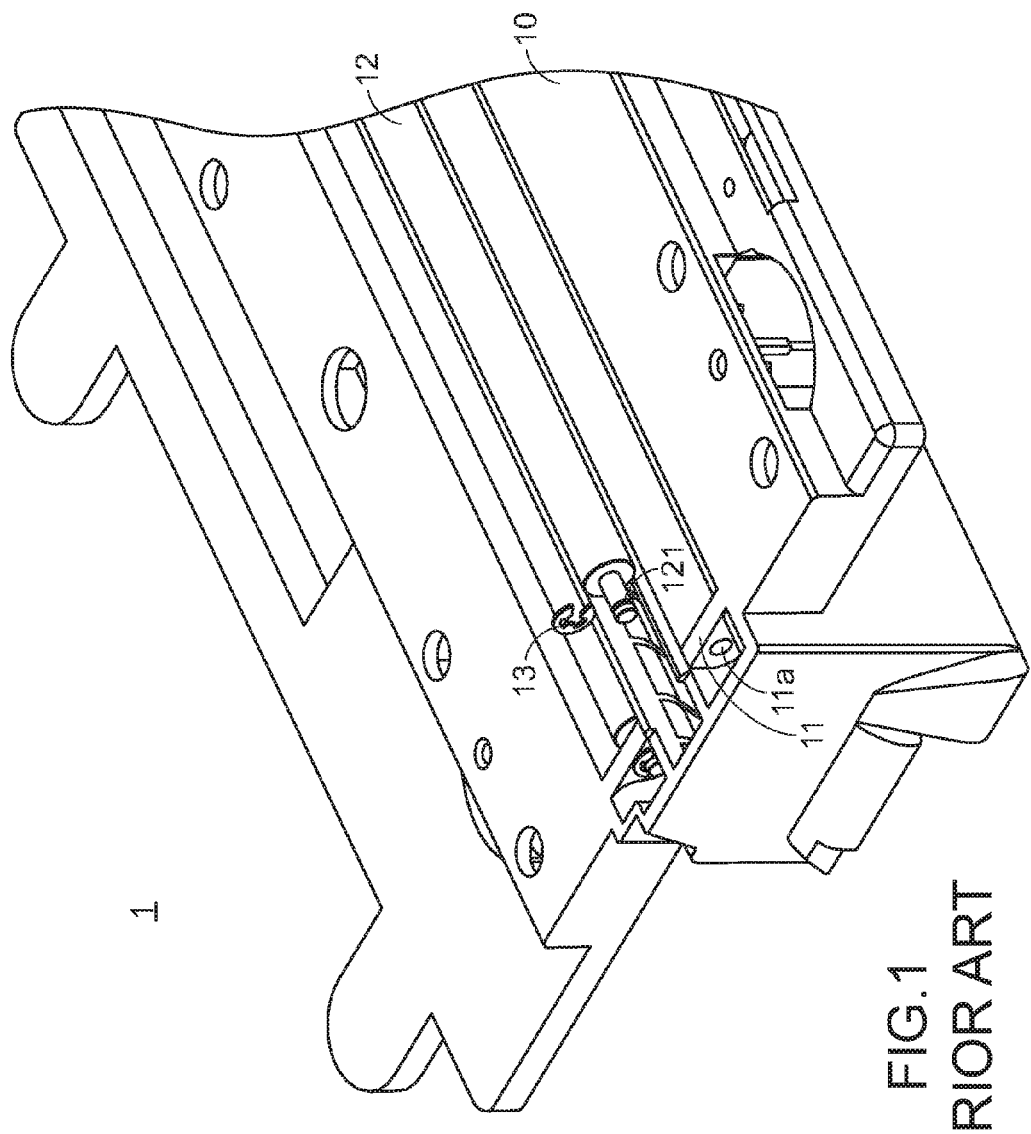
FIG. 1 is a schematic exploded view illustrating a conventional shaft positioning device.
Figure 2:
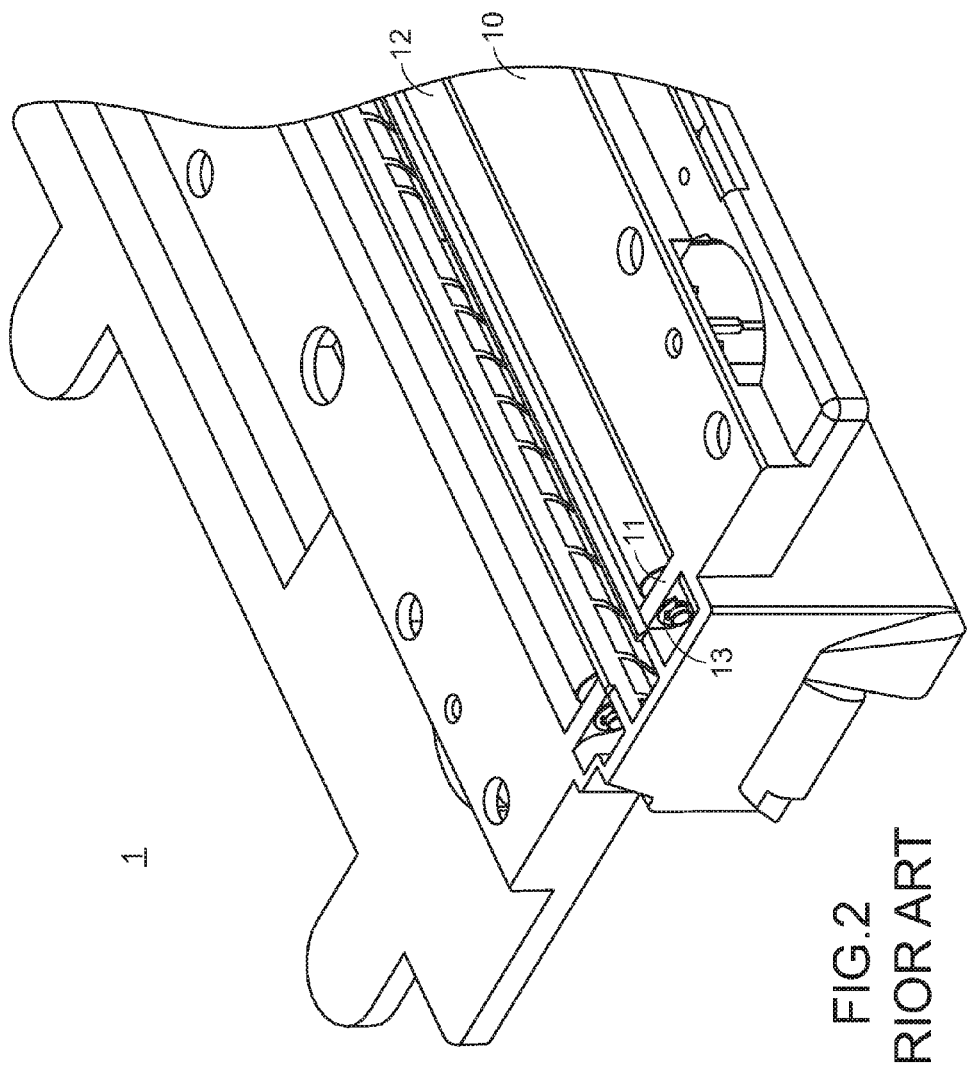
FIG. 2 is a schematic assembled view illustrating the conventional shaft positioning device of FIG. 1.
Figure 3:
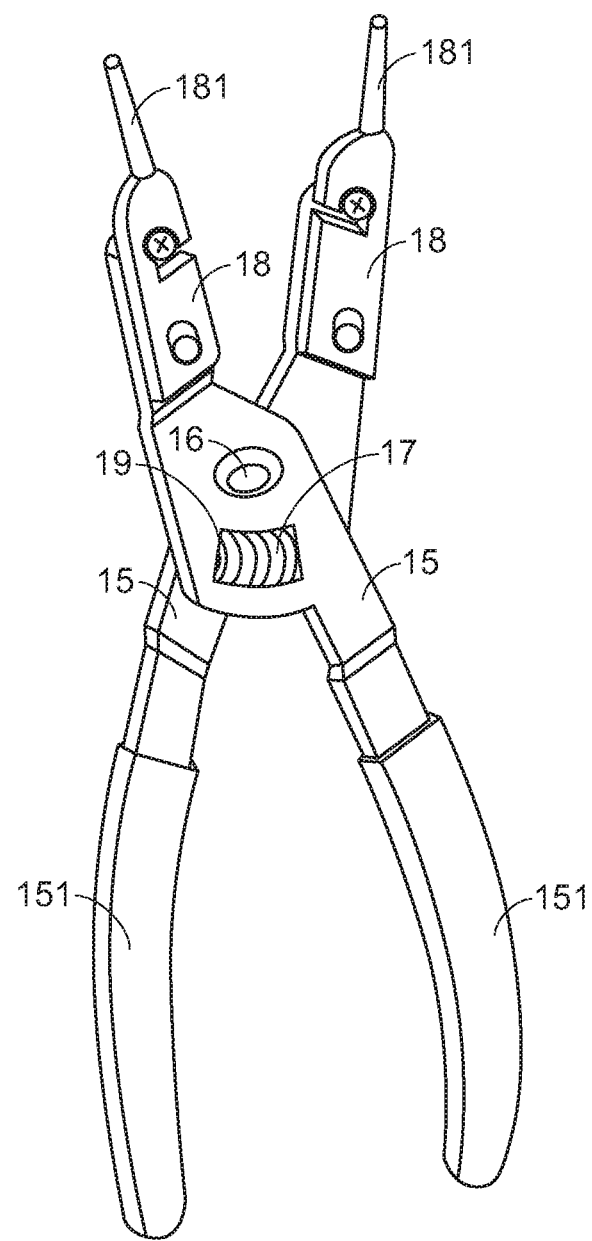
FIG. 3 is a schematic perspective view illustrating an installation tool for installing the position-limiting element.
Figure 4:
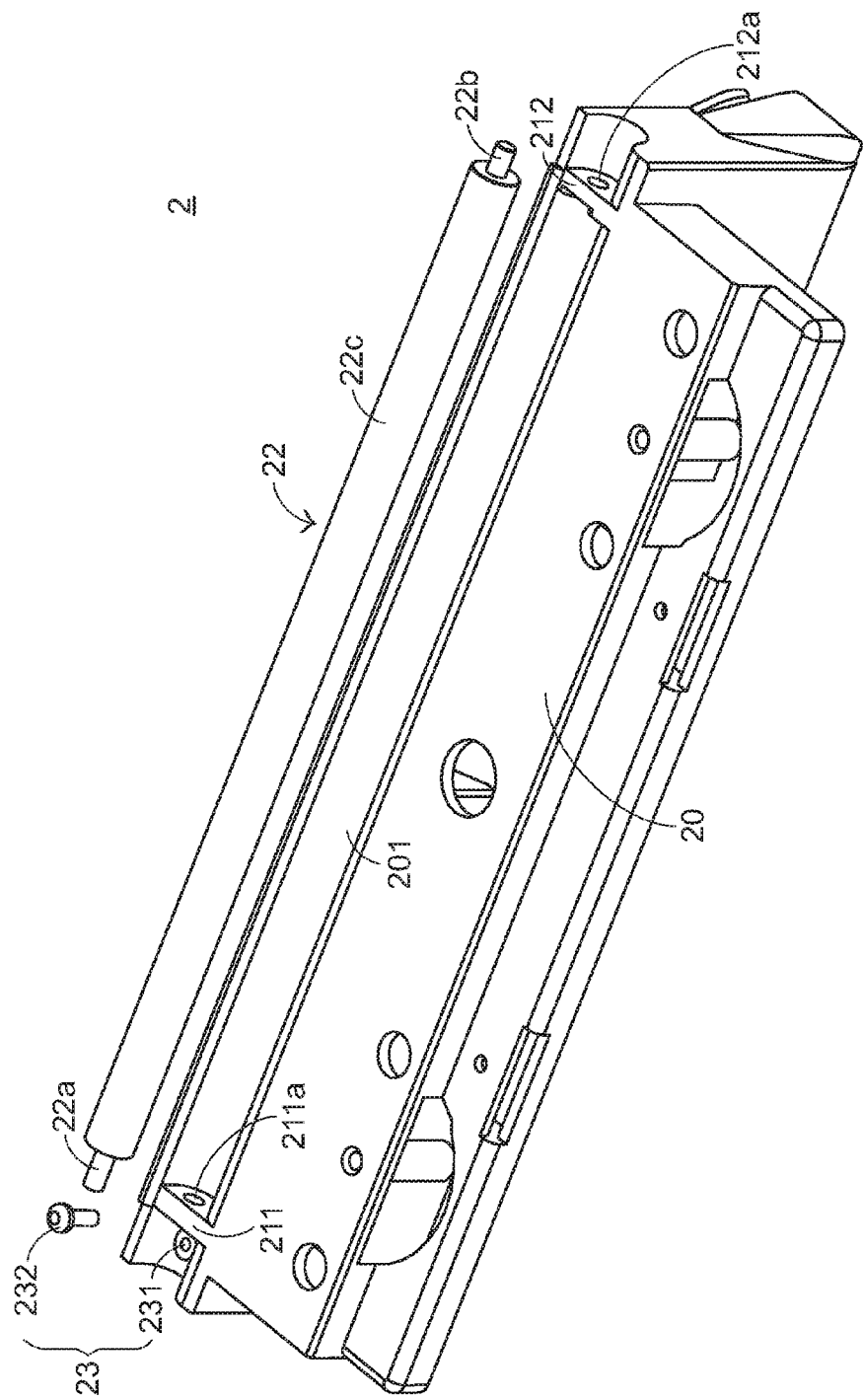
FIG. 4 is a schematic exploded view illustrating a shaft positioning device according to a first embodiment of the present invention.
Figure 5:
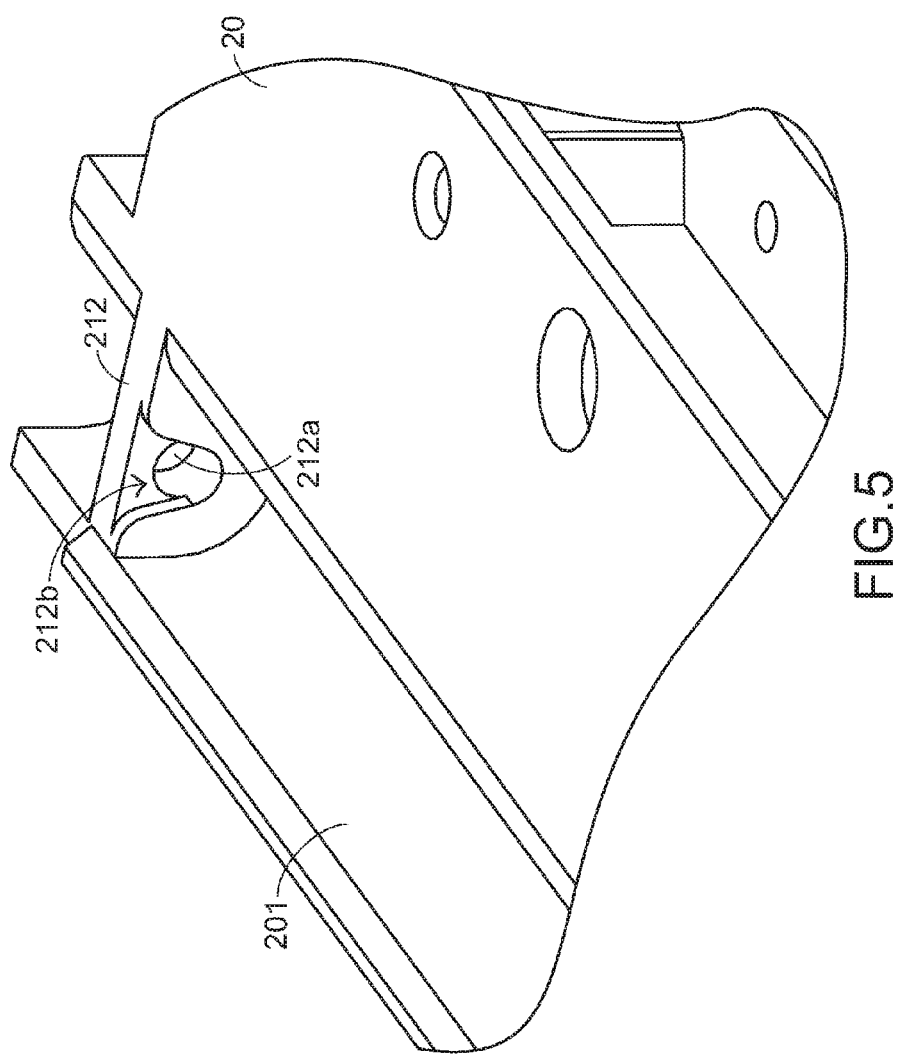
FIG. 5 is a schematic enlarged fragmentary view illustrating a second supporting part of the shaft positioning device of FIG. 4.

Hereinafter, a shaft positioning device according to a first embodiment of the present invention will be illustrated with reference to FIGS. 4 and 5. FIG. 4 is a schematic exploded view illustrating a shaft positioning device according to a first embodiment of the present invention. FIG. 5 is a schematic enlarged fragmentary view illustrating a second supporting part of the shaft positioning device of FIG. 4.

As shown in FIGS. 4 and 5, the shaft positioning device 2 comprises a base 20, a first supporting part 211, a second supporting part 212, a shaft 22, and a position-limiting structure 23. The shaft 22 comprises a cylindrical body 22c. The cylindrical body 22c is arranged between a first end 22a and a second end 22b of the shaft 22. The diameter of the cylindrical body 22c is larger than the diameters of the first end 22a and the second end 22b of the shaft 22. The base 20 comprises an elongated groove 201. The position-limiting structure 23 comprises a fixing recess 231 and a fixing element 232. Moreover, the first supporting part 211 comprises a first hole 211a, and the second supporting part 212 comprises a second hole 212a. In this embodiment, both of the first hole 211a and the second hole 212a are through-holes. Moreover, the second supporting part 212 further comprises a guiding notch 212b. The guiding notch 212b is formed in an inner surface of the second supporting part 212.

Figure 6:
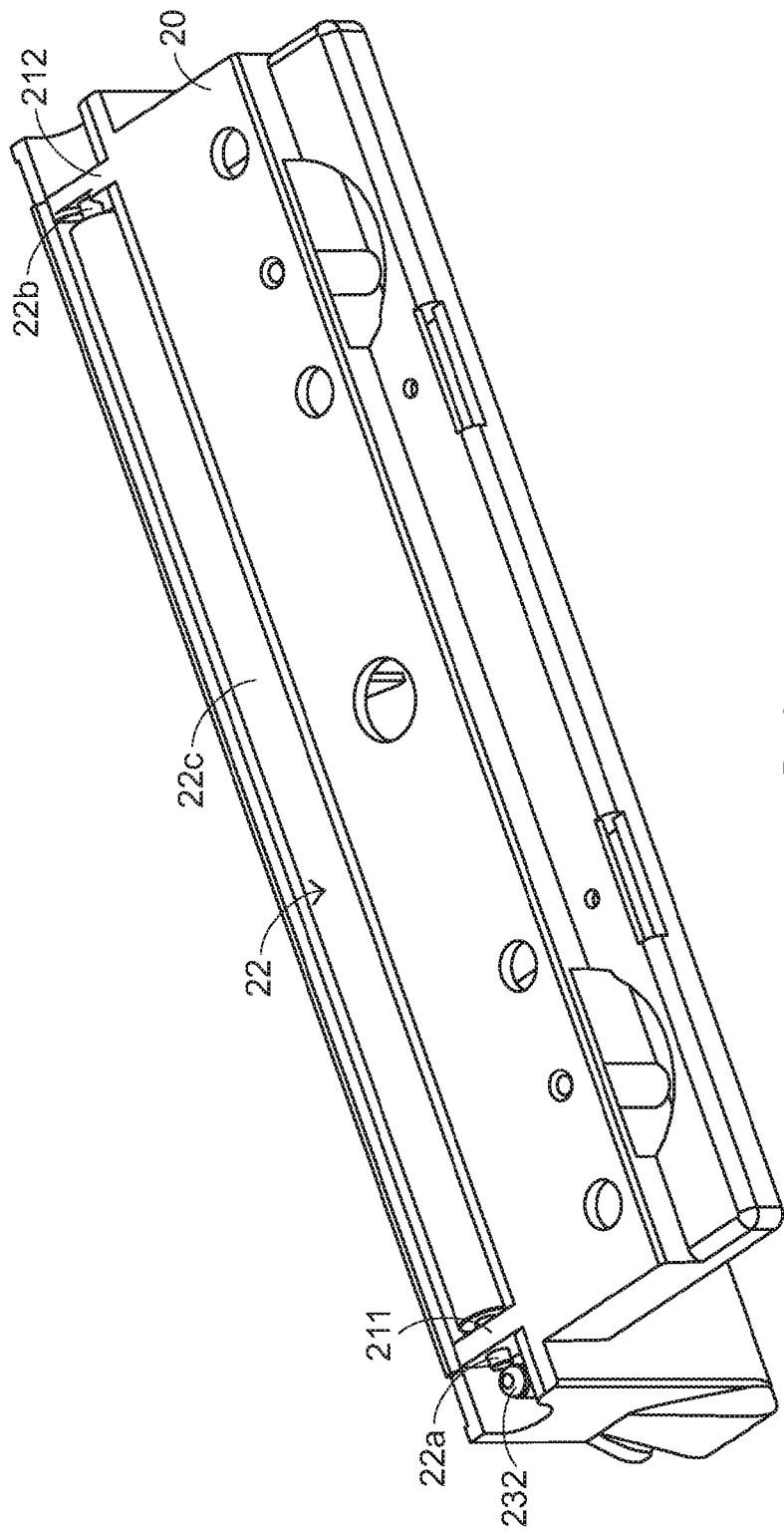
FIG. 6 is a schematic assembled view illustrating the shaft positioning device of FIG. 4.

FIG. 6 is a schematic assembled view illustrating the shaft positioning device of FIG. 4. Hereinafter, a sequence of assembling the shaft positioning device 2 according to the first embodiment of the present invention will be illustrated with reference to FIGS. 4, 5 and 6.

Firstly, the base 20 is provided. The elongated groove 201 is formed in the base 20. The first supporting part 211 and the second supporting part 212 are disposed within the elongated groove 201, and located at the positions near a first end and a second end of the elongated groove 201. The fixing recess 231 is disposed within the elongated groove 201, and located beside the first supporting part 211.

Subsequently, the shaft 22 is installed by the following steps. First of all, the first end 22a of the shaft 22 is firstly penetrated through the first hole 211a, so that the first end 22a of the shaft 22 is moved to a position over the fixing recess 231. Then, the second end 22b of the shaft 22 is introduced into the guiding notch 212b though a position over the second supporting part 212. Then, the second end 22b of the shaft 22 is moved downwardly along the guiding notch 212b to a position aligned with the second hole 212a. Then, the second end 22b of the shaft 22 is penetrated through the second hole 212a.

Afterwards, the fixing element 232 is disposed within the fixing recess 231, and partially protruded from a position beside the first end 22a of the shaft 22. Since the first end 22a of the shaft 22 is stopped by the fixing element 232, the first end 22a of the shaft 22 fails to be moved to the position over the fixing recess 231. Under this circumstance, the second end 22b of the shaft 22 fails to be detached from the second hole 212a.

Furthermore, the shaft 22 may be moved away from the first supporting part 211 until the shaft 22 is stopped by the second supporting part 212. When the shaft 22 fails to be moved, the first end 22a of the shaft 22 will not be detached from the first hole 211a. As a consequence, the position of the shaft 22 is limited within the range between the first supporting part 211 and the second supporting part 212.

Figure 7:
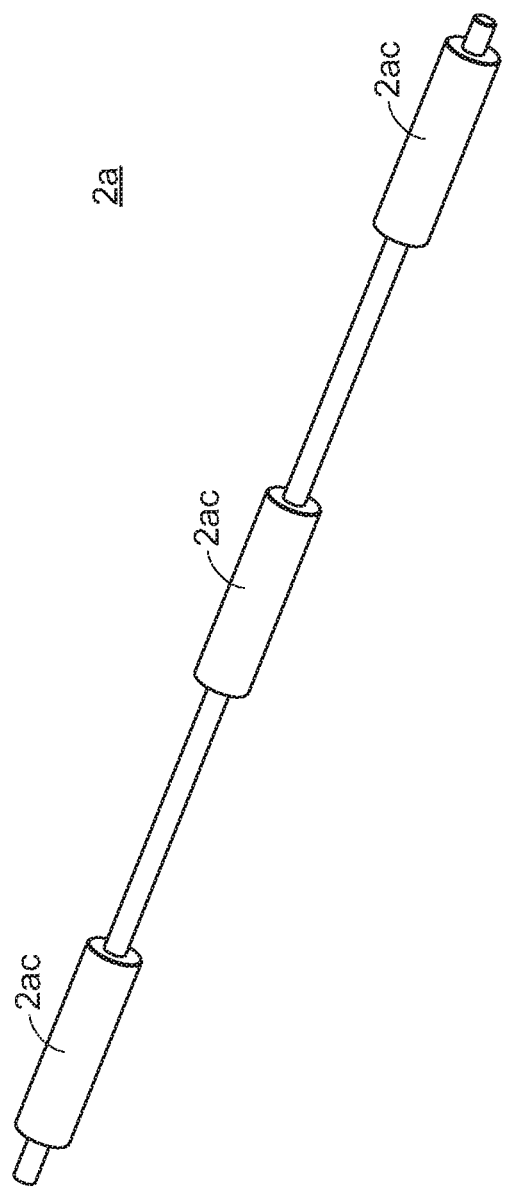
FIG. 7 is a schematic perspective view illustrating a second type shaft applied to the shaft positioning device according to the first embodiment of the present invention.

It is noted that the shaft positioning device 2 according to the first embodiment of the present invention is not only employed to position the shaft 22. FIG. 7 is a schematic perspective view illustrating a second type shaft applied to the shaft positioning device according to the first embodiment of the present invention. As shown in FIG. 7, plural rollers 2ac are sheathed around the shaft 2a. The shaft positioning device 2 is capable of limiting the position of the shaft 2a within the range between the first supporting part 211 and the second supporting part 212.

Figure 8:
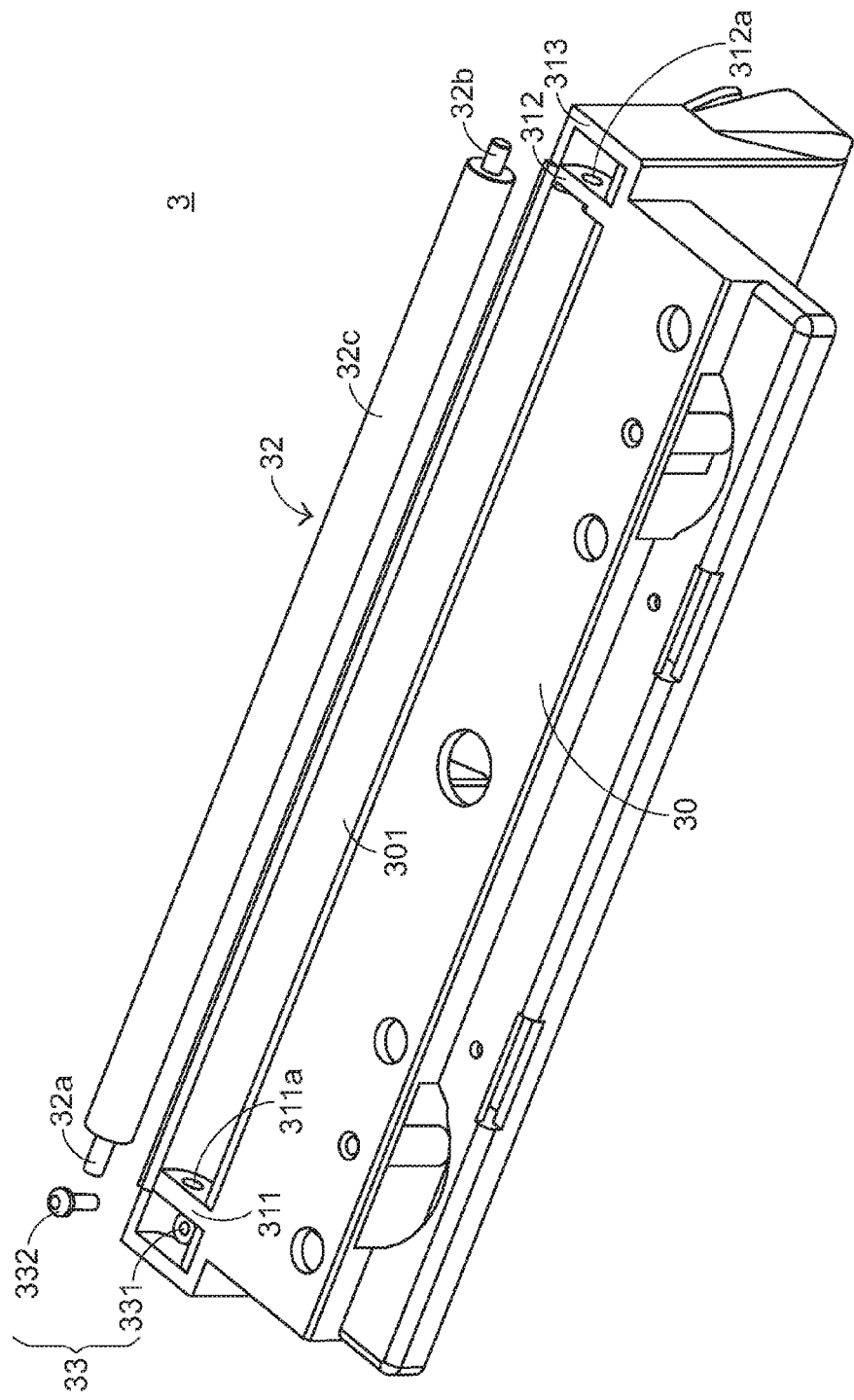
FIG. 8 is a schematic exploded view illustrating a shaft positioning device according to a second embodiment of the present invention.

Hereinafter, a shaft positioning device according to a second embodiment of the present invention will be illustrated with reference to FIG. 8. FIG. 8 is a schematic exploded view illustrating a shaft positioning device according to a second embodiment of the present invention. As shown in FIG. 8, the shaft positioning device 3 comprises a base 30, a first supporting part 311, a second supporting part 312, a sidewall 313, a shaft 32, and a position-limiting structure 33. The shaft 32 comprises a cylindrical body 32c. The cylindrical body 32c is arranged between a first end 32a and a second end 32b of the shaft 32. The diameter of the cylindrical body 32c is larger than the diameters of the first end 32a and the second end 32b of the shaft 32. The base 30 comprises an elongated groove 301. The position-limiting structure 33 comprises a fixing recess 331 and a fixing element 332. Moreover, the first supporting part 311 comprises a first hole 311a, and the second supporting part 312 comprises a second hole 312a. In this embodiment, both of the first hole 311a and the second hole 312a are through-holes.

In comparison with the first embodiment, the shaft positioning device 3 of the second embodiment further comprises the sidewall 313.

Hereinafter, a sequence of assembling the shaft positioning device 3 according to the second embodiment of the present invention will be illustrated with reference to FIG. 8.

Firstly, the base 30 is provided. The elongated groove 301 is formed in the base 30. The first supporting part 311 and the second supporting part 312 are disposed within the elongated groove 301, and located at the positions near a first end and a second end of the elongated groove 301. The sidewall 313 is disposed within the elongated groove 301, and located beside the second supporting part 312. The fixing recess 331 is disposed within the elongated groove 301, and located beside the first supporting part 311.

Except for the following steps, the method for installing the shaft 32 is similar to the method for installing the shaft 22 of the first embodiment, and is not redundantly described herein. That is, after the first end 32a and the second end 32b of the shaft 32 are respectively penetrated through the first hole 311a and the second hole 312a and the fixing element 332 is disposed within the fixing recess 331, the shaft 32 is moved away from the first supporting part 311 until the shaft 32 is stopped by the sidewall 313 or the second supporting part 312. Moreover, during the shaft 32 is moved away from the first supporting part 311, the first end 32a of the shaft 32 is not detached from the first hole 311a.

Figure 9:
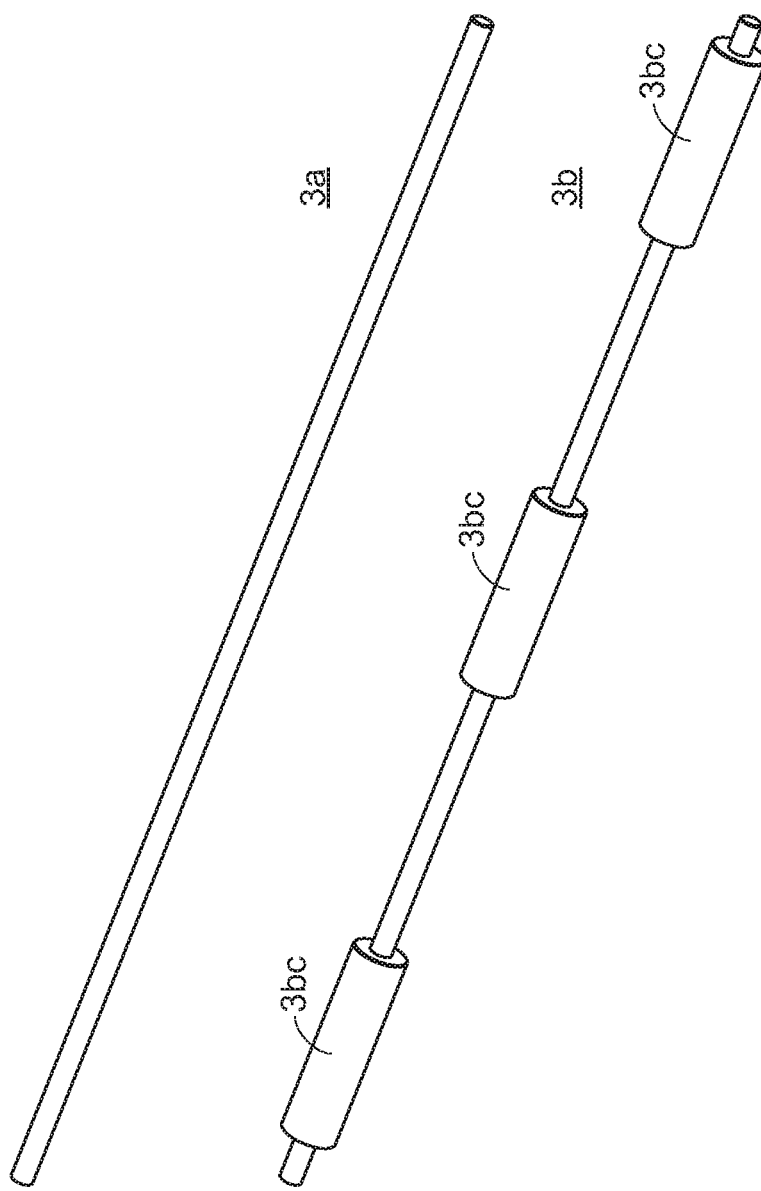
FIG. 9 is a schematic perspective view illustrating a second type shaft and a third type shaft applied to the shaft positioning device according to the second or third embodiment of the present invention.

It is noted that the shaft positioning device 3 according to the second embodiment of the present invention is not only employed to position the shaft 32. FIG. 9 is a schematic perspective view illustrating a second type shaft and a third type shaft applied to the shaft positioning device according to the second embodiment of the present invention. As shown in FIG. 9, plural rollers 3bc are sheathed around the shaft 3b. The shaft positioning device 3 is also capable of limiting the position of either the second type shaft 3a or the third type shaft 3b within the range between the first supporting part 311 and the second supporting part 312.

Figure 10:
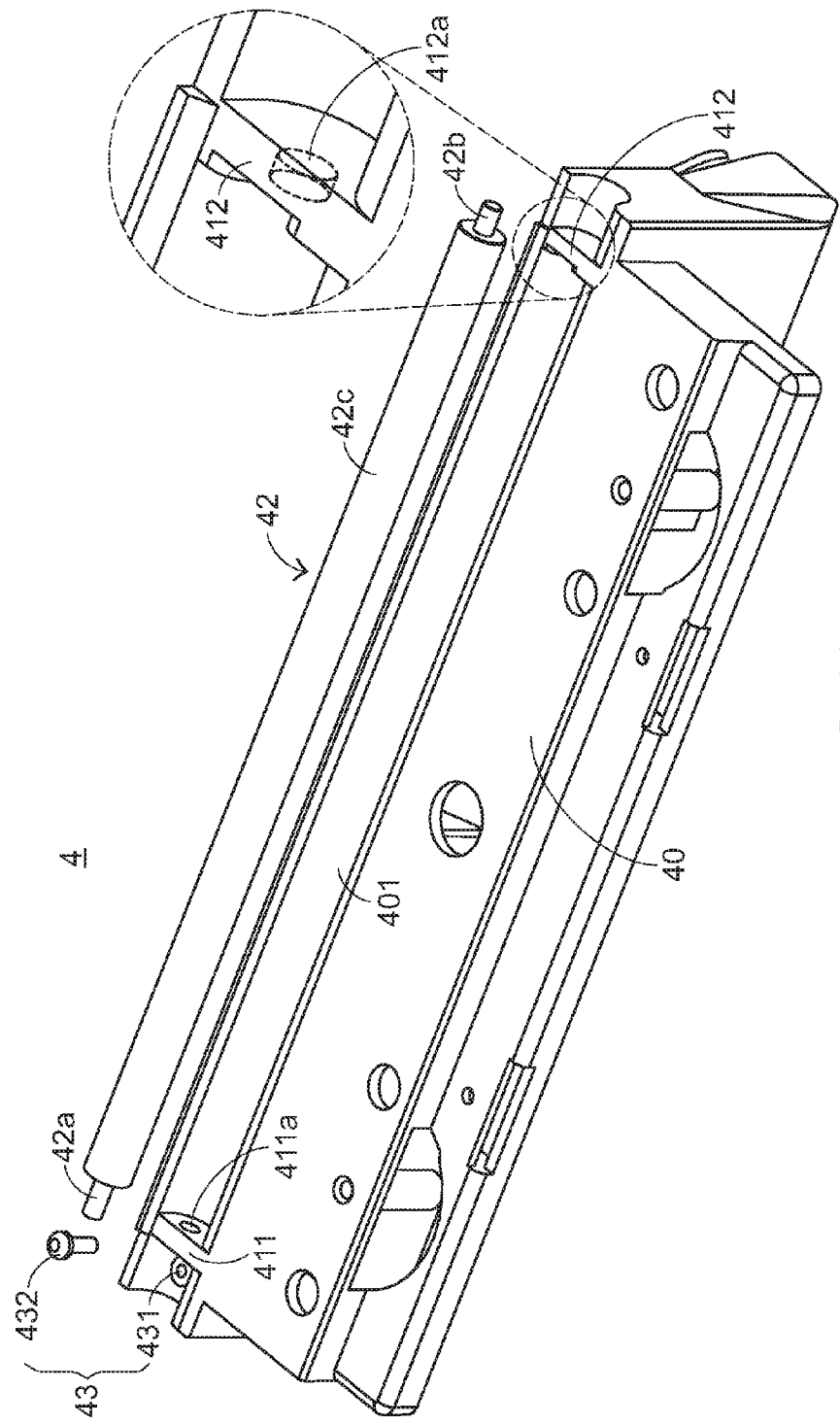
FIG. 10 is a schematic exploded view illustrating a shaft positioning device according to a third embodiment of the present invention.

Hereinafter, a shaft positioning device according to a third embodiment of the present invention will be illustrated with reference to FIG. 10. FIG. 10 is a schematic exploded view illustrating a shaft positioning device according to a third embodiment of the present invention. As shown in FIG. 10, the shaft positioning device 4 comprises a base 40, a first supporting part 411, a second supporting part 412, a shaft 42, and a position-limiting structure 43. The shaft 42 comprises a cylindrical body 42c. The cylindrical body 42c is arranged between a first end 42a and a second end 42b of the shaft 42. The diameter of the cylindrical body 42c is larger than the diameters of the first end 42a and the second end 42b of the shaft 42. The base 40 comprises an elongated groove 401. The position-limiting structure 43 comprises a fixing recess 431 and a fixing element 432. Moreover, the first supporting part 411 comprises a first hole 411a, and the second supporting part 412 comprises a second hole 412a. In this embodiment, the first hole 411a is a through-hole, and the second hole 412a is a blind hole.

In comparison with the first embodiment, the second hole 412a of the shaft positioning device 4 of the third embodiment is a blind hole.

Hereinafter, a sequence of assembling the shaft positioning device 4 according to the third embodiment of the present invention will be illustrated with reference to FIG. 10.

Firstly, the base 40 is provided. The first supporting part 411 and the second supporting part 412 are disposed within the elongated groove 401, and located at the positions near a first end and a second end of the elongated groove 401. The fixing recess 431 is disposed within the elongated groove 401, and located beside the first supporting part 411.

Except for the following steps, the method for installing the shaft 42 is similar to the method for installing the shaft 32 of the second embodiment, and is not redundantly described herein. That is, after the first end 42a and the second end 42b of the shaft 42 are respectively penetrated through the first hole 411a and the second hole 412a and the fixing element 432 is disposed within the fixing recess 431, the shaft 42 is moved away from the first supporting part 411 until the shaft 42 is contacted with the distal end of the second hole 412a or stopped by second supporting part 412. Moreover, during the shaft 42 is moved away from the first supporting part 411, the first end 42a of the shaft 42 is not detached from the first hole 411a.

It is noted that the shaft positioning device 4 according to the third embodiment of the present invention is not only employed to position the shaft 42. For example, the second type shaft 3a and the third type shaft 3b may be applied to the shaft positioning device 4 according to the third embodiment. The shaft 3b comprises plural rollers 3bc. The plural rollers 3bc are sheathed around the shaft 3b. The shaft positioning device 4 is also capable of limiting the position of either the second type shaft 3a or the third type shaft 3b within the range between the first supporting part 411 and the second supporting part 412.

In the above embodiments, the fixing recess is a screw hole, and the fixing element is a screw. As long as the fixing element is disposed within the fixing recess and partially protruded from the position beside the shaft for limiting the movable distance of an end of the shaft, the fixing recess is not restricted to the screw hole and the fixing element is not restricted to the screw.

Moreover, in the above embodiments, the first supporting part, the second supporting part, the fixing recess and the sidewall are all disposed within the elongated groove of the base, and the fixing recess is disposed within the elongated groove. However, as long as the first supporting part, the second supporting part, the fixing recess and the sidewall are disposed on the base and the fixing recess is formed in the base, the scopes of the present invention are not restricted.

From the above descriptions, the present invention provides a shaft positioning device. The fixing element is located beside the shaft. Moreover, for removing the shaft, the shaft should be previously moved toward the fixing element. Due to the special design, the two ends of shaft will not be detached from the first hole of the first supporting part and the second hole of the second supporting part.

In other words, the shaft positioning device of the present invention is capable of positioning various types of shafts without the need of reserving large installation spaces beside the first supporting part and the second supporting part. By means using the shaft positioning device of the present invention, the shaft can be limited within the range between the first supporting part and the second supporting part. Consequently, the fabricating cost is reduced, the installing convenience is enhanced, and the overall volume is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A shaft positioning device for positioning a shaft having a first end and a second end, comprising:
    a base for accommodating the shaft therein;
    a first supporting part disposed on said base, and comprising a first hole, wherein said first end of the shaft is penetrated through said first hole;
    a second supporting part disposed on said base, and comprising a second hole, wherein said second end of said shaft is penetrated through said second hole;
    a fixing recess formed in said base and disposed at a side of said first supporting part opposite to said second supporting part so that said fixing recess is at least partially covered by said first end of said shaft when said second end of said shaft is movably disposed outside said second hole, and said fixing recess is exposed from said first end of said shaft when said second end of said shaft is movably disposed inside said second hole; and
    a fixing element to be coupled to said fixing recess, said fixing element being detachable from said fixing recess for facilitating attachment/detachment of said shaft to/from said base and disposed within said fixing recess for confining an axial movement of said shaft in said base.

2. The shaft positioning device according to claim 1, wherein said first hole is a through-hole, and said second hole is a blind hole.

3. The shaft positioning device according to claim 2, wherein said base further comprises an elongated groove, wherein said first supporting part, said second supporting part and said fixing recess are all disposed within said elongated groove.

4. The shaft positioning device according to claim 1, wherein both of said first hole and said second hole are through-holes.

5. The shaft positioning device according to claim 4, wherein said base further comprises an elongated groove, wherein said first supporting part, said second supporting part and said fixing recess are all disposed within said elongated groove.

6. The shaft positioning device according to claim 4, further comprising a sidewall, wherein said sidewall is located at a side of said second supporting part opposite to said first supporting part for confining an axial movement of said shaft in said base.

7. The shaft positioning device according to claim 6, wherein said base further comprises an elongated groove, wherein said first supporting part, said second supporting part, said fixing recess and said sidewall are all disposed within said elongated groove.

8. The shaft positioning device according to claim 1, wherein said fixing recess is a screw hole, and said fixing element is a screw.

9. The shaft positioning device according to claim 1, wherein said second supporting part further comprises a guiding notch, wherein said guiding notch is formed in an inner surface of said second supporting part.

10. The shaft positioning device according to claim 1, wherein said fixing element, after coupling to said fixing recess, protrudes from said fixing recess to a certain level so as to physically stop said shaft from free movement in said base.

* * * * *